June 10, 1941.   W. B. BARNES   2,244,668
PLANETARY GEAR DRIVE
Filed July 18, 1938   4 Sheets-Sheet 1

INVENTOR.
William B. Barnes,
BY Hood + Hahn.
ATTORNEYS.

June 10, 1941.   W. B. BARNES   2,244,668
PLANETARY GEAR DRIVE
Filed July 18, 1938   4 Sheets-Sheet 2
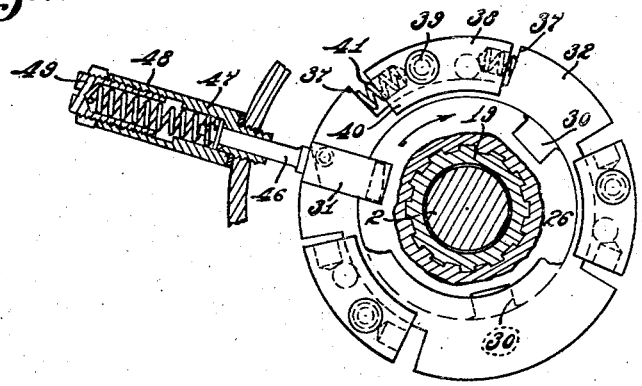
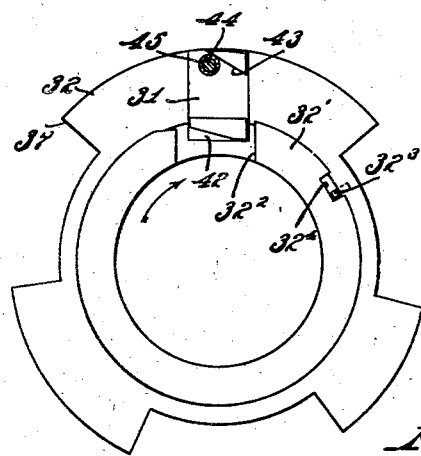
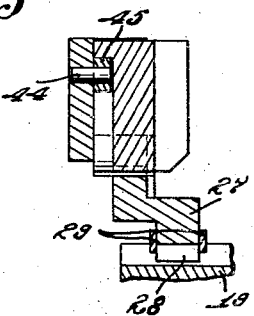
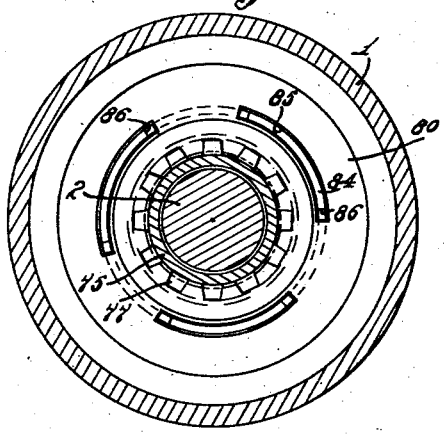
INVENTOR.
William B. Barnes,
BY Hood & Hahn
ATTORNEYS.

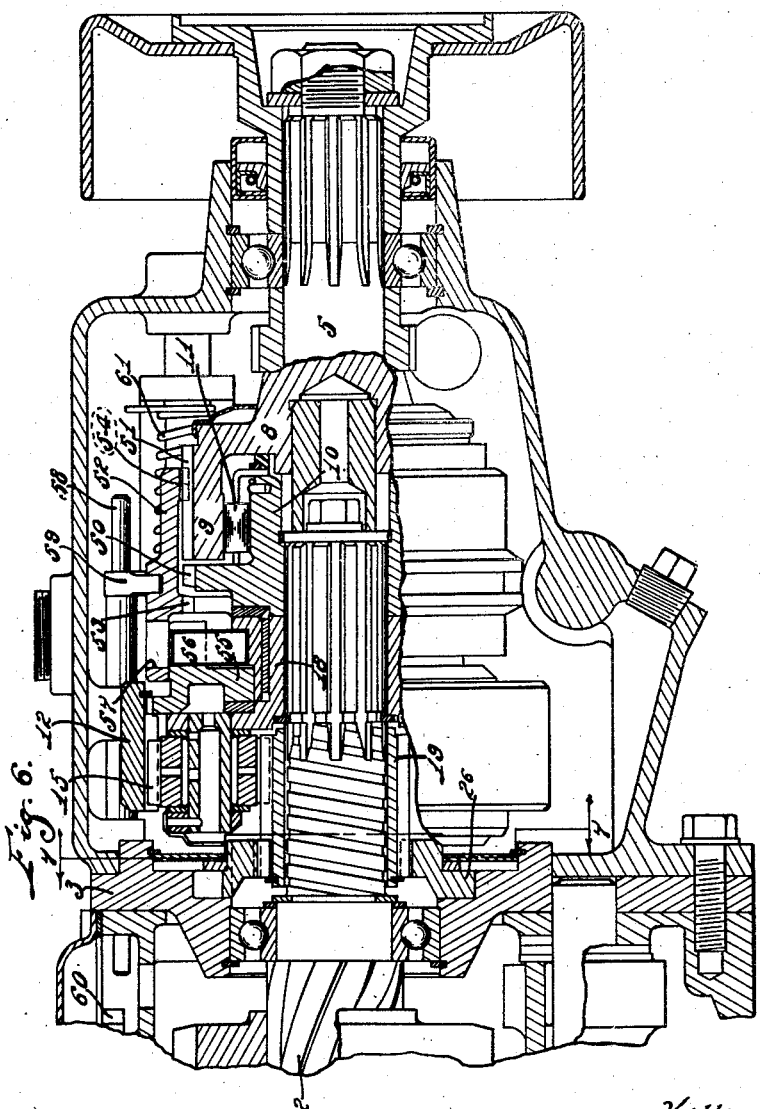

June 10, 1941.  W. B. BARNES  2,244,668
PLANETARY GEAR DRIVE
Filed July 18, 1938  4 Sheets-Sheet 4

INVENTOR.
William B. Barnes,
BY Hood & Hahn.
ATTORNEYS.

Patented June 10, 1941

2,244,668

UNITED STATES PATENT OFFICE 2,244,668

PLANETARY GEAR DRIVE

William B. Barnes, Muncie, Ind., assignor to Barnes Motor Developments Company, Muncie, Ind., a partnership composed of said William B. Barnes and Freda Arthur Barnes Application July 18, 1938, Serial No. 219,728

16 Claims. (Cl. 74—290)

The present invention relates to improvements in transmissions, particular to that type of transmissions adapted for use in vehicle drive.

More specifically, my invention relates to improvements in the so-called overdrive transmissions wherein the speed of the driven shaft is stepped up above that of the driving shaft through the instrumentality of a gearing.

In certain types of transmissions now in commercial use, there is provided a planetary transmission through which, when the vehicle reaches predetermined speed, an overdrive of the propeller shaft may be established. In certain of these transmissions, it is desirable to establish a direct one-to-one drive between the driving and propeller shafts under certain driving conditions without the necessity of permitting the vehicle to drop back whereby the automatic means responds to a slower speed in the drive.

It is one of the objects of my present invention to provide means whereby a direct one-to-one drive may be established between the driving and driven shafts without affecting the automatic means which initially established the overdrive.

In a specific embodiment of this type of control, I provide a sun gear brake, one member of which is adapted to be connected to the sun gear and is provided with toothed recesses. The other member is rotatably stationarily mounted and is provided with a dog or teeth adapted to engage the teeth or toothed recesses of the member connected with the sun gear. As a result, when under certain conditions, namely, when the sun gear is permitted to rotate for the establishment of a one-to-one drive between the driving and driven shafts, there is a relative movement between the relatively stationary member and the sun gear toothed member, resulting in a chatter between the parts. Furthermore, there are times when, with the sun gear holding member rotating at a fairly high speed and the relatively stationary locking member engaging, there would be danger of the parts becoming destroyed. As a result, it is desirable to provide some means for blocking the engagement of the holding or breaking members under certain predetermined conditions and it is one of the objects of the present invention to provide such blocking means.

Further objects and advantages of the invention will appear more fully hereinafter in the accompanying specification and claims.

The present application is a continuation, in part, of my copending application, Serial No. 74,622, filed April 16, 1936, which application resulted in my U. S. Letters Patent No. 2,127,637, dated August 23, 1938.

For the purpose of disclosing my invention, I have illustrated certain embodiments thereof in which Fig. 1 is a longitudinal section of a transmission embodying my invention;

Fig. 3 is a detail section taken on the line 3—3 of Fig. 1;

Fig. 4 is a detail section showing certain operative parts;

Fig. 5 is a rear elevation of a locking dog;

Fig. 6 is a longitudinal sectional view of a modified form of my invention;

Fig. 10 is a sectional view taken on the line 10—10 of Fig. 9.

Figure 1:
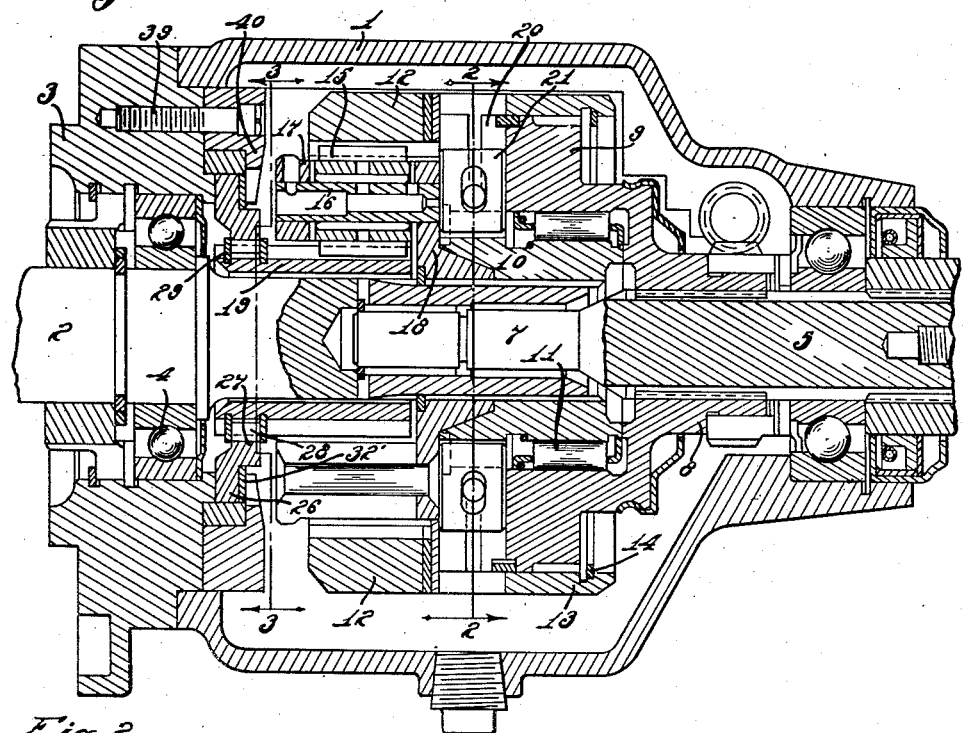
Figure 2:
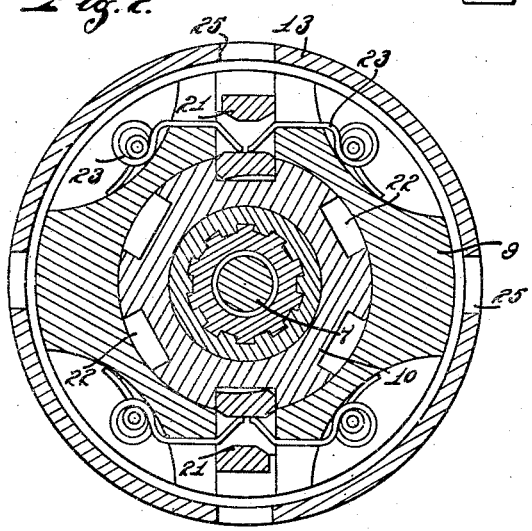
Fig. 2 is a sectional view taken on the line 2—2 of Fig. 1.

In the embodiment of the invention illustrated in Figs. 1 to 5 inclusive, the overdrive transmission is of the planetary gear type and is enclosed within a suitable casing 1. A driving shaft 2 projects into this casing and this driving shaft as a rule is driven from the standard change speed transmission having three speeds forward and one reverse which is now commercially in use in most of the automobiles of the present day. This driving shaft projects through the front wall 3 of the casing 1 and is supported in suitable ball bearings 4. A driven or propeller shaft 5 extends into the rear of the casing 1; being supported by suitable ball bearings 6 and having its end 7 piloted in the hollow rear end of the driving shaft 2. A sleeve or hub 8 surrounds and is splined upon the propeller shaft 5 and this sleeve or hub supports an overhanging head 9, the inner periphery of which forms one member of an overrunning clutch. The opposite or cam member 10 of the overrunning clutch is splined upon the end of the driving shaft 2 and suitable rollers 11 are interposed between the members 9 and 10 to provide an overrunning clutch.

The ring gear 12 of the planetary gearing is provided with an annular extension 13 rotatably mounted on and crowning the head 9, being maintained against axial displacement on the head by the medium of a split ring 14 fitting within an interior annular groove in the extension 13. The ring gear 12 is adapted to mesh with a plurality of planetary pinions 15 mounted on suitable shafts 16 supported in a pinion cage including a cage member 17 in which the shafts 16 are journaled and the cage member 18 in which the opposite ends of the shafts are journaled, this cage member 18 being splined on the driving shaft 2 and therefore rotatable with the driving shaft. The pinions 15 in turn mesh with a sun gear formed on the sleeve 19 surrounding the shaft 2 and held against rotation by a suitable brake mechanism hereinafter more fully described.

The head 9 on its face is provided with a series of radial slots or recesses 20 adapted to receive a series of radially movable dogs 21 adapted in their retracted position to engage in dog-receiving notches or recesses 22 in the hub 10. These dogs are biased in their retracted position, and in engaging position with the recesses 22 by means of suitable springs 23. These dogs 21 are adapted to move radially outwardly under the influence of centrifugal force when the speed of the head 9 reaches a predetermined point and when so moved outwardly under centrifugal force are adapted to disengage from the recesses 22 and to engage in notches or recesses 25 formed in the sleeve 13, thereby locking the sleeve 13 to the head 9 so that the head 9 will rotate in unison with the ring gear 12 of the transmission.

In order to understand the operation of so much of the structure as has been described, it will be assumed that the sun gear 19 is held against rotation and that the dogs 21 are in their retracted position and engaging in the recesses 22. Under these circumstances, a one-to-one drive is established between the shaft 2 and the shaft 5 through the hub 10, the dogs 21 and the overhanging member 9, which it will be remembered is splined to the shaft 5. When, however, the speed of the parts reaches the point where centrifugal force is sufficient to overcome the retractile effect of the springs 23, the dogs will move outwardly under this centrifugal force into a position to disengage from the hub 10 and into a position to engage into the notches or recesses 25. When the dogs 21 disengage from the notches 22, a one-to-one drive will still be maintained through the overrunning clutch including the parts 9, 10 and 11. Bearing in mind, however, that the sun gear is stationary and that the pinion cage is being driven from the driving shaft 2, the ring gear will be driven faster than the head 9 and therefore the recesses or slots 25 will be rotating past the dogs 21 faster than the rotative movement of the dogs. Under these circumstances, with the dogs with the construction shown in the accompanying drawings, that is, with the tops of the dogs slightly cammed over, the dogs will not engage in the slots 25 until the speed of the head 9 and the sleeve 13 approach substantial synchronism. If the operator, therefore, removes his foot from the accelerator of the automobile, thereby permitting the shaft 2 to drop down in speed, the ring gear and its sleeve 13 will correspondingly drop down in speed until the slots 25 and the dogs 21 approach synchronism, at which time the dogs 21 will slip into the slots 25 thereby locking the ring gear to the head 9 and therefore, as soon as the shaft 2 is again accelerated, the propeller shaft 5 will be driven through the planetary gearing at a greater speed than that of the shaft 2. The overrunning clutch, of course, permits this relative rotation, as the clutch members are so arranged as to engage only when the shaft 2 becomes the driving member. If the shaft 5 rotates at a greater speed than the shaft 2, the clutch overruns.

The sun gear sleeve 19 is held against rotation by a releasable brake mechanism which, in the structure illustrated in Figs. 1 to 5 inclusive, may be caused to automatically release by simply modifying the relative speed between the shafts 5 and 2. To this end, I provide a holding disc 26, the hub 27 of which is splined to the sleeve 19 and is held through the medium of the teeth 28 and is held against axial displacement on the sleeve 19 by means of the split rings 29. This disc is provided on its periphery with a plurality of dog-receiving notches 30 which are adapted to receive the radially movable dog 31. This dog is carried in a radial slot formed in a ring 32 surrounding the disc 26. This ring is provided with a series of radial abutments 37 between which are interposed stop blocks secured by screws 39 to the wall 3 of the casing. These stop blocks have overhanging portions 40 which overlap the ring 32 and prevent axial displacement thereof. Interposed between the stop blocks 38 and the abutments 37 are coiled springs 41 which act as cushions to take up the rotative jar on the discs 26 when the same is stopped against rotation by engagement of the dog 31.

A radially movable dog 31 is provided at its lower end with an engaging portion 42 which, when the dog is in retracted or engaging position, is adapted to engage in one of the notches 30. This dog is also provided on its rear face with a cam surface 43 adapted to cooperate with a stationary pin 44 fastened in the end wall 3 of the casing and provided with a suitable roller 45 to reduce friction between the parts. The dog is biased in its engaging position through the medium of a radially movable stem 46 which projects into a housing 47 secured to the exterior of the casing 1 and between one end of which and a collar on the pin 46 is interposed a coiled spring 48 which places the stem 46 under pressure, tending to move the dog 31 into engaging position. In order to vary the tension of the spring 48, an adjustable screw 49 threads into the housing 47 and provides an abutment member for the spring 48.

Due to the fact that the stop locks 38 are shorter than the distance between the abutments 37, a slight rotative movement is permitted on the part of the ring 32, in which is slidably mounted the restraining dog 31. The frictional drag between the ring 32 and the disc 26 is such as to cause the ring 32 to rotate with the disc 26 until the rotative movement is taken up by the stop 38. Under these circumstances, we will assume that an overdrive has been established through the planetary gear in the manner heretofore described. If the operator of the vehicle desires to establish a direct drive between the shafts 2 and 5 without permitting the vehicle to slow down sufficiently to cause the dogs 21 to retract, he will momentarily throttle the engine by closing the throttle or removing his foot from the accelerator. This will tend to establish a coast load rotating the sun gear in a clockwise direction, looking at Fig. 3, which will produce a correspondent movement of the sun gear disc 26, thus rotating the ring 32 carrying with it the dog 31. Due to the fact that there is practically no load on the dog 31 and due to the fact that the ring 32 and with it the dog 31, is rotating in a clockwise direction, the cam 43 will ride the roller 44, moving the dog 31 radially in a direction to disengage the same from the notch 30. This releases the holding disc 26 and if now the operator suddenly accelerates the engine and with it the driving shaft 2, the sun gear disc 26 will be rotated with an accelerated movement in a counter clockwise direction, moving the recess or notch 30 past the dog 31 so that the same will not drop back into the notch to again lock the sun gear. There will be, of course, under these circumstances, a tendency for the ring 32 to likewise move in a counter clockwise direction, but there is sufficient inertia in the ring to prevent this ring from immediately following the sun gear disc so that the sun gear disc will be moved into a position with the notch 30 out of alignment with the dog prior to any tendency on the part of the ring 32 to move the dog back into engaging position.

With the sun gear disc released, the sun gear and its disc will rotate and with the sun gear rotating, the overdrive planetary gearing will be effective to drive the shaft 5 from the shaft 2. However, bearing in mind that the overrunning clutch, including the parts 9, 10, and 11, is interposed between the shafts, a direct drive will be established between the shafts 2 and 5 through the overrunning clutch.

With the sun gear disc 26 freely rotating, and with the dog 31 biased into an engaging position, there would be a constant tendency on the part of the dog to chatter, due to the rotation of the disc 26 past the same. In order to prevent this chattering on the part of the dog and as a further preventive of reengagement of the dog 31 after it has once been disengaged to establish the direct drive through the overrunning clutch, I provide a baulk ring 32' which surrounds the hub 27 of the sun gear disc and has sufficient frictional engagement therewith to tend to rotate with the sun gear disc. The rotative movement of this baulk ring, however, is limited by a pin 32³ operating in an elongated notch 32⁴ in the ring 32'. This baulk ring is provided with a dog-accommodating notch 32² which, when properly aligned with the dog 31 will permit the dog to move down into one of the notches 30. However, with the dog disengaged, as heretofore explained, the baulk ring, due to its frictional engagement with the hub of the disc 26 will be rotated a sufficient distance to move one end thereof beneath the dog, thereby preventing reengaging movement thereof. However, when the speed of the driving shaft 2 is permitted to drop, thereby tending to rotate the disc 26 in a counterclockwise direction, this baulk ring will be moved out of blocking position for the dog 31 and the dog will be permitted to move into reengaging position. When the drive through the overdrive gear train is released as above described and established through the one-way clutch, this direct drive will be maintained as long as the throttle is maintained in an open position. If, however, it is desired to return to the overdrive, the throttle is again closed, thus permitting the driven shaft to overrun the driving shaft. The deceleration of the engine, and with it the driving shaft 2, causes the sun gear to come to a standstill and then rotate or tend to rotate backwards and with this tendency, the dog 31 will move inwardly and into reengagement with one of the recesses 30, the baulk ring having been moved out of baulking position as heretofore described.

Figure 7:
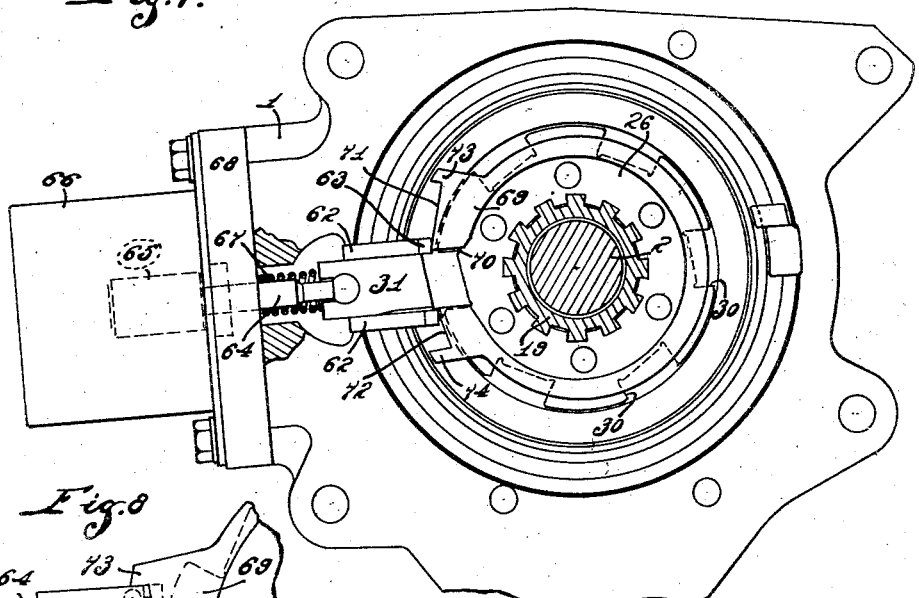
Fig. 7 is a sectional view taken on the line 7—7 of Fig. 6.
Figure 8:
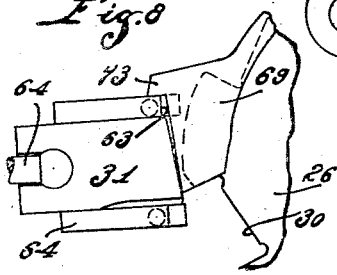
Fig. 8 is a detail section showing the b'ocker ring in blocking position.

In the Figures 6 and 7, I have illustrated a modification of the embodiment of my invention, wherein the retaining dog or the sun gear is radially moved outwardly through the medium of some positive operating mechanism, such for instance as a solenoid or by other suitable instrumentalities, although in the application, I have merely illustrated the solenoid operating device.

In the structure illustrated in Figs. 6 and 7, the driving shaft 2 is driven, as in the structures heretofore described, from the usual three speed forward and one reverse transmission, and the propeller shaft 5 is adapted for connection with the vehicle propelling wheels. This propeller shaft, as in the structure heretofore described, is provided with the hub 8 splined thereon, having the head 9. The inner member 10 of the overrunning clutch is likewise splined on the shaft 2, as heretofore described, and this overrunning clutch includes the rollers 11. Likewise, a ring gear 12 is provided which meshes with the pinions 15 in turn meshing with the sun gear teeth on the sleeve 19.

The hub 10 is provided with teeth 50 in axial alignment with the teeth 51 on the hub 9 and a toothed sleeve 52 surrounds these two hubs having teeth 53 adapted to engage the teeth 50 when the sleeve 52 is actively moved to the right, looking at Fig. 6. Teeth 54 are in constant engagement with the teeth 51 on the hub 9.

The ring gear 12 is mounted on a rotatable member 55 surrounding and rotating on the hub 18 of the pinion cage which hub, as is heretofore described, is splined on the shaft 2. This rotatable member 55 is provided with a series of radially movable dogs 56 similar in operation and construction to the dogs 21 of the structure illustrated in Fig. 1 and these dogs 56, when moved radially outward, are caused to engage the notches 57 formed in the sleeve 52. It should be mentioned, at this point, however, that the dogs do not, when in retracted position, lock up with the driving shaft to establish the two-way one-to-one drive, as is the case in the structure illustrated in Figs. 1 to 5. In other respects, however, the operation of these dogs is similar to that of the structure heretofore described. When the speed of the parts reaches the predetermined point, as is the case of the structure illustrated in Figs. 1 to 5, the dogs 56 will move outwardly, thereby connecting the pinion ring gear 12 with the propeller shaft 5. If it is desired to establish a two-way direct drive, with the structure illustrated, the sleeve 52 is shifted to the right, looking at Fig. 6, until the teeth 50 are engaged by the teeth 53. Under these circumstances, the hub 10 is directly connected with the hub 8 through the sleeve and a direct two-way drive is established between the shafts. At the same time, due to this lateral shifting of the sleeve 52, the notches or openings 57 are moved out of alignment with the dogs 56 so that there is no possibility of the dogs moving into engaging position with the sleeve. This shift of these parts may be established through suitable instrumentalities controlled by the operator and is provided as a means for establishing a two-way direct drive when the regular transmission is shifted into reverse. To this end, a shift rod 58, having a shift fork 59 is provided for shifting the sleeve 52 and this shift rod is adapted to be struck by the shift rod 60 of the transmission when this shift rod is moved into reverse position. A coiled spring 61 biases the sleeve 52 normally in non-lockup position.

With the parts in a position illustrated in the drawings, it is obvious that when the dogs 56 respond to centrifugal force sufficiently to cause them to engage in the slots 57 in the sleeve 52, the ring gear 12 will be locked to the head 9, thereby connecting the ring gear to the propeller shaft 5 and an overdrive will be established through the planetary gearing, it being assumed, of course, that the sun gear sleeve 19 is held against rotation.

As in the other structure illustrated, it is sometimes desirable to establish a direct drive through the overrunning clutch parts from the shaft 2 to the shaft 5 without dropping the speed of the parts down to the point where the dogs 30 will disengage. As in the structure heretofore described, in order to accomplish this, the sun gear sleeve 19 is releasably held against rotation through the medium of the sun gear holding disc 26 which is substantially the same in construction, in this structure, as in the structure illustrated in Figs. 1 to 5, cooperating with the radially movable dog 31 which is substantially of the same structure as that illustrated in Figs. 1 to 5. However, in the present structure, the dog operates in a slot in the end wall 3 of the casing 1 and is held in this slot against rotative movement. This dog 31 operates between a pair of hardened steel wire plates 62 which are provided with face notches 63 for a purpose more fully hereinafter described. The dog is connected by an operating pin or rod 64 which, in turn, is connected with a solenoid 65 of an electro magnet 66, mounted in a casing secured on the side of the casing 1. A coiled spring 67 biases the dog into engaging position, this coil spring being interposed between the top of the dog and the bottom of the plate 68 of the casing 66 and surrounding the rod or pin 64.

A baulk ring 69, similar in general construction to the baulk ring 32' surrounds the hub of the holding disc 26 and has sufficient frictional engagement therewith to tend to rotate with this hub. This ring, as the ring 32', has a pawl accommodating opening 70 therein and formed on the ring on either side of this opening are enlarged shoulders 71 and 72 backed respectively by lugs 73 and 74. The notches 63 in the plates 62 are substantially the same width as that of the baulk ring and the tops of these notches are sufficient to permit the shoulders 71 and 72 to move in the notches. These notches, however, are not sufficiently deep to permit the passage past the wear plates 62 of the lugs or shoulders 73 and 74. The circuit through the solenoid may be controlled in any suitable manner, as by providing a circuit closing device within the control of the operator, preferably in connection with the accelerator and so positioned that the accelerator pedal, when moved all the way down, will close the circuit through the solenoid. It is to be remembered that so long as the dog 31 is in engagement in one of the notches 30 and is under load, the dog will not move to disengaged position. However, if the load is removed from the dog and the circuit closed through the solenoid 66, the solenoid will be sufficiently strong to move the dog 31 against the action of the coiled spring 67, to disengage the dog from its notch 30. Therefore, in order to release the sun gear disc 26, the operator first relieves the dog 31 of load conditions, as by removing his foot from the accelerator pedal, permitting the engine to slow down and then before a load can again be established, moves the accelerator pedal to a position to close the circuit through a solenoid. The closing of the circuit through the solenoid, with the dog under no load conditions, will release the dog from its engaged notch, thereby permitting the sun gear disc and the sun gear to rotate freely, rendering the overdrive inoperative and permitting the establishment of a direct drive through the overrunning clutch.

As the sun gear disc 26 commences to rotate, the baulk ring 69 will likewise commence to rotate therewith and the portion 71 will move beneath the dog 31, until the baulk ring is stopped by the engagement of the shoulder 73 with one of the guide plates 62. The baulk ring thus moving into position will prevent the return movement of the dog 31 under the influence of the spring 67 even though the circuit through the solenoid 66 should be broken and this baulk ring 69 will remain in position until the engine speed has been sufficiently lowered to permit the overrunning of the shaft 5 relatively to the shaft 2 thereby causing a reverse rotation of the sun gear disc. As soon as the sun gear disc commences to rotate in the opposite direction, the frictional engagement between the disc hub and the baulk ring will rotate the baulk ring in an opposite direction until the dog 31 can slip into engagement with one of the notches 30 in the sun gear disc. Due to the particular shape of the dog, it being cammed in the direction indicated in the drawings, the dog will slip into its engaging position before the shoulder 72 of the baulk ring can move beneath the same. However, there are certain conditions which could arise where it would be dangerous for the dog to engage in one of the notches of the sun gear disc, particularly if this sun gear disc should be rotating at a very high speed. With the sun gear disc rotating at a very high speed in a counterclockwise direction, looking at Fig. 7, the baulk ring would be rotated therewith and the shoulder 72 could slip beneath the dog 31 before the dog could be moved into engaging position.

Figure 9:
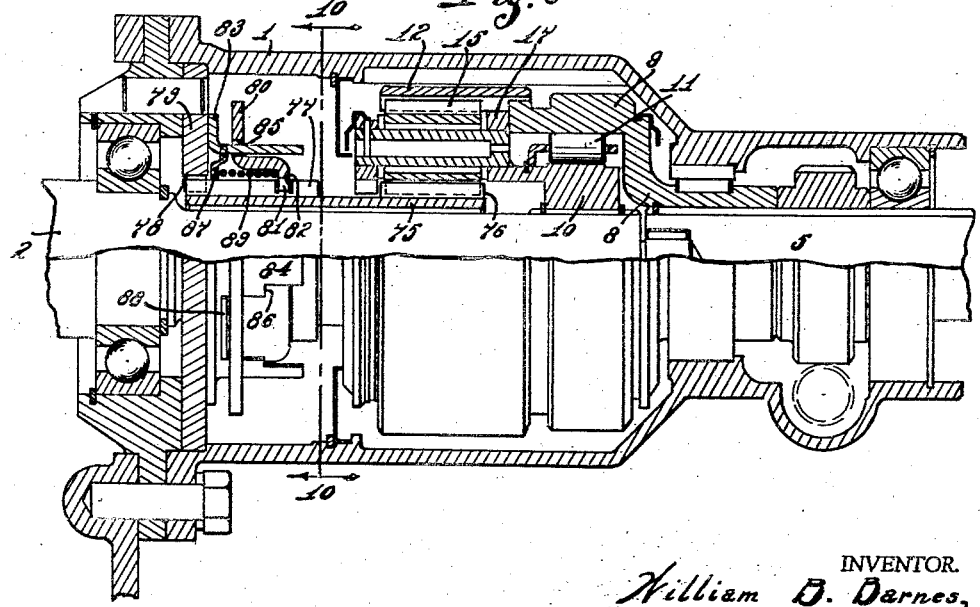
Fig. 9 is a longitudinal sectional view of another modified form of my invention.

In the structure illustrated in Figs. 9 and 10, I have shown a still further modification of my invention. In this structure, the driving shaft 2 is adapted to drive the propeller shaft 5 as in the structures heretofore described, and this shaft 5 has splined thereon the hub 8 provided with a head 9 forming one member of an overrunning clutch, the other member 10 of the overrunning clutch, as in the structure heretofore described, is splined on the shaft 2, the rollers 11 being interposed between these members. The member 10 has connected therewith, to be driven thereby, the cage 17 of the planet pinions 15. The ring gear 12 in this instance is directly connected to the head 9 without the interposition of the centrifugally operated automatic clutch heretofore illustrated and described. A sun gear sleeve 75 surrounds the shaft 2 being provided with sun gear teeth 76 and with holding teeth 77 which teeth are adapted to engage locking teeth 78 on a ring 79 secured to the end wall 3 of the casing against rotative movement. Therefore, as long as the teeth 77 are in engagement with the teeth 78, the sun gear sleeve 75 is held against rotation and an overdrive is established. This sleeve 75 is axially shiftable and when the sleeve 75 is shifted to the right, looking at Fig. 9, until the teeth 77 disengage from the teeth 78, the sleeve 75 will be permitted to freely rotate. In this instance, it will be noted that the positive or toothed clutch mechanism is axially movable wherein in the structures heretofore illustrated, the positive or toothed clutch mechanism for holding the sun gear against rotation has one member radially movable with respect to the shaft 2. A shift ring 80 has a portion 81 engaging in an annular groove 82 in the sleeve 75 through the medium of which the sleeve 75 may be shifted axially. Any suitable instrumentality may be used for the purpose of shifting the ring 80. Associated with this ring 80 is a baulk member which consists of a flat ring 83 adapted, under certain predetermined conditions, to make frictional engagement with the face of the ring 79. This disc or ring 83 is provided with a plurality of fingers 84 projecting through elongated slots 85 in the ring 80. These fingers lie parallel with the axis of the shaft 2 and each of these fingers has formed on the side walls thereof shoulders 86. That is, the fingers 84, towards their bases are considerably wider than towards their ends, whereby the shoulders 86 are provided. The slots 85 are sufficiently long to accommodate the widest portion of the fingers 84. A ring 87 surrounds and has tooth engagement with the sleeve 75 and is provided with teeth 88 fitting the spaces between the fingers 84 and interposed between this ring 87 and the ring 80, at the base thereof, is a coiled spring 89. With this construction, assuming that the teeth 77 are disengaged from the teeth 78 and there is a bias against the ring 80 tending to move the sleeve 75 axially, to the left, looking at Fig. 9, the coiled spring pressing on the ring 87 and through this ring on the disc 83 will cause the disc 83 to frictionally engage with the disc 79, thereby dragging the disc 83 to the point where the shoulders on one side of the fingers have moved out of alignment with the openings in the disc 80 and the disc is therefore blocked against further movement and with it the axially shifting of the sleeve 75 is likewise blocked thereby preventing any chattering between the teeth 77 and 78. If, however, the shaft 2 is slowed down to the point where the shaft 5 is overrunning the same, there will be a tendency for the sleeve 75 to rotate in the opposite direction or backwards to the point where the shoulders 86 clear the ends of the slot and with this bias still exerted on the member 80, the teeth 77 and 78 may be engaged. In other words, the discs 83 and its accompanying fingers 84 act substantially as a baulk member or baulk ring in substantially the same manner as is the case of the baulk ring 69 in the structure illustrated in Fig. 7 and the baulk ring 32' in the structure illustrated in Fig. 5.

I claim as my invention:

1. The combination with a driving shaft and a driven shaft, of a planetary gearing for establishing driving connection between said shafts, including a sun gear, releasable means for holding said sun gear against rotation, and means moved into operative position by the rotation of said sun gear, when released, for preventing reengagement of said holding means during the continued rotation of said sun gear.

2. The combination with a driving shaft and a driven shaft, of a planetary gearing for establishing driving connection between said shafts, including a sun gear, a releasable holding means for holding said sun gear against rotation including a rotatably stationary holding member, and a member rotatable with said sun gear adapted to be engaged by said rotatably stationary member for holding said sun gear against rotation, and means moved between said members by the rotation of said sun gear when said holding means is released to prevent reengagement of said members during a continued rotation of said sun gear.

3. The combination with a driving shaft and a driven shaft, of a planetary gearing for establishing a driving connection between said shafts including, releasable holding means for said sun gear comprising a rotatably stationary member, and means on said sun gear adapted to be engaged by said member for holding said sun gear against movement, blocking means moved by the rotation of said sun gear into blocking position to prevent reengagement of said holding means when the same is released, said blocking means being movable into unblocking position upon the reversed rotative movement of said sun gear to permit engagement of the holding means.

4. The combination with a driving shaft and a driven shaft, of a planetary gearing for establishing a driving connection between said shafts including a sun gear, releasable means for holding said sun gear against rotation comprising a rotatably stationary member and a member on said holding means adapted to be engaged thereby for holding the sun gear against rotation, blocking means moved into blocking position by the rotative movement of said sun gear when the holding means is released to prevent reengagement of the holding means, said blocking means being moved out of blocking position by a reverse rotative movement of said sun gear and additional blocking means movable under predetermined conditions into blocking position by said reverse movement of the sun gear.

5. The combination with a driving shaft and a driven shaft, of a planetary gearing for establishing a driving connection between said shafts including a sun gear, releasable means for holding said sun gear against rotation including a rotatably stationary member and a member adapted to be engaged thereby connected to the sun gear, blocking means adapted to rotate with said sun gear when said holding means is released to prevent reengagement of said holding means and means for limiting the rotative movement of said blocking means.

6. The combination with a driving shaft and a driven shaft, of a planetary gearing for establishing a driving connection between said shafts, including a sun gear, releasable holding means for preventing rotation of said sun gear for establishing a driving connection between said shafts through said gearing and comprising a rotatably stationary member, and means connected to the sun gear adapted to be engaged by said stationary member for holding the sun gear against rotation, a blocking ring rotatable with said sun gear for a limited distance and moved into blocking position by the rotation of said sun gear for preventing reengagement of said holding means, when released, during the rotation of said sun gear.

7. The combination with a driving shaft and a driven shaft, of a planetary gearing for establishing a drive between said shafts, an overrunning clutch for establishing a drive between said shafts, releasable holding means for holding said sun gear against rotation to establish a drive between said shafts through said overrunning clutch, said holding means including a rotatably stationary member and a member connected with said sun gear adapted for engagement with said holding means to prevent rotation of the sun gear, blocking means movable into blocking position to prevent reengagement of said holding means when released by the rotative movement of said sun gear, said blocking means being moved into unblocking position by the slowing down of said driven shaft to the point where said driving shaft causes said sun gear to reverse the direction of its movement.

8. The combination with a driving shaft and a driven shaft, of a planetary gearing for establishing a driving connection between said shafts including a sun gear, releasable means for holding said sun gear against rotation, comprising a rotatably stationary member and a member on said sun gear adapted to be engaged by said rotatably stationary member, means for biasing said stationary member into engaging position, means for moving said rotatably stationary member out of engaging position to release said sun gear and against said biasing means and blocking means moved into blocking position by the rotation of said sun gear to prevent reengagement of said holding means under the influence of said biasing means during a continued rotation of said sun gear.

9. The combination with a driving shaft and a driven shaft, of a planetary gearing for establishing a driving connection between said shafts including a sun gear, releasable holding means for preventing rotation of said sun gear, comprising a rotatably stationary member, and a member connected to the sun gear adapted to be engaged thereby to hold the sun gear against rotation, means for biasing said rotatably stationary member into engaging position, means for moving said rotatably stationary member into disengaging position, blocking means moved into blocking position by the rotation of said sun gear when released to prevent reengagement of said holding means during the rotation of said sun gear, said blocking means being movable out of blocking position by rotation of said sun gear in a reverse direction, and a second blocking means movable into blocking position, under certain predetermined conditions, by the reverse movement of said sun gear, to prevent reengagement of said holding means.

10. The combination with a driving shaft and a driven shaft, of a planetary gearing for establishing a driving connection between said shafts, including a sun gear, holding means for preventing rotation of said sun gear comprising a rotatably stationary radially movable dog, toothed means rotatably connected with said sun gear adapted to be engaged by said dog for preventing the rotation of the sun gear, a blocker ring rotatably mounted to rotate with said sun gear under predetermined conditions, having an opening therein to permit the passage of the dog therethrough into engagement with the toothed sun gear member, said blocker ring being rotatable with the sun gear to move said opening out of alignment with said dog when the dog is moved into released position to prevent reengaging of said dog during the rotation of said sun gear.

11. The combination with a driving shaft and a driven shaft, of a planetary gearing for establishing a driving connection between said shafts including a sun gear, releasable holding means for holding said sun gear against rotation comprising a rotatably stationary radially movable dog and a toothed disc rotatably connected with said sun gear adapted to receive said dog and prevent rotation of the sun gear, means for biasing said dog into engaging position, means for moving said dog radially into disengaging position, a blocker ring rotated by said sun gear and movable into blocking position by the rotation of said sun gear when said dog is moved into released position, and means for limiting the rotative movement of said blocker ring.

12. The combination with a driving shaft and a driven shaft, of a planetary gearing for establishing driving connection between said shafts, including a sun gear, releasable interengaging holding means including a rotationally stationary member and a rotatable member for holding said sun gear against rotation, means for releasably preventing engagement of said members, and friction means for moving said preventing means into preventing position upon rotation of said rotatable member when released from said stationary member.

13. The combination with a driving shaft and a driven shaft, of a planetary gearing for establishing driving connection between said shafts including a sun gear, releasable interengaging holding means including a rotationally stationary member and a rotatable member for holding said sun gear against rotation, preventing means having a rotatable movement into position for preventing engagement of said interengaging members, and frictional means for imparting said rotative movement to said preventing means upon rotation of said sun gear when released.

14. The combination with a driving shaft and a driven shaft, of a planetary gearing including a sun gear for establishing driving connection between said shafts, interengaging means for holding said sun gear against rotation comprising a pair of brake members, one of which is rotationally stationary and the other of which is adapted for rotation, changing from one direction to the opposite direction relative to said stationary member, means for releasably preventing the engagement of said members, said preventing means, in response to a change of direction of relative rotation of said members, operating to permit the engagement of said members.

15. The combination with a driving shaft and a driven shaft, of a planetary gearing including a sun gear for establishing driving connection between said shafts, releasable for holding said sun gear against rotation, comprising a pair of brake members, one of which is rotationally stationary and the other of which is adapted for rotation, changing from one direction to the opposite direction relative to said stationary member, means for releasably preventing engagement of said members and friction means operating to move said preventing means into preventing position by the rotation of said rotatable member relative to the stationary member in one direction and operating to move said preventing means out of preventing position by the change in direction of relative rotation of said braking members.

16. The combination with a driving shaft and a driven shaft, of a planetary gearing including a sun gear for establishing a driving connection between said shafts, and including releasable holding means for said sun gear comprising interengaging members, one of which is rotatably stationary and the other of which is connected to said sun gear, for holding said sun gear against rotative movement, blocking means for preventing engagement of said holding means, friction means operated by the rotative movement of said sun gear for moving said blocking means into preventing position, said friction means moving said blocking means into unblocking position by a reverse rotative movement of the sun gear.

WILLIAM B. BARNES.